Feb. 7, 1933.     C. R. HOUGHTON     1,896,527
TANDEM METER
Filed March 12, 1928     5 Sheets-Sheet 1
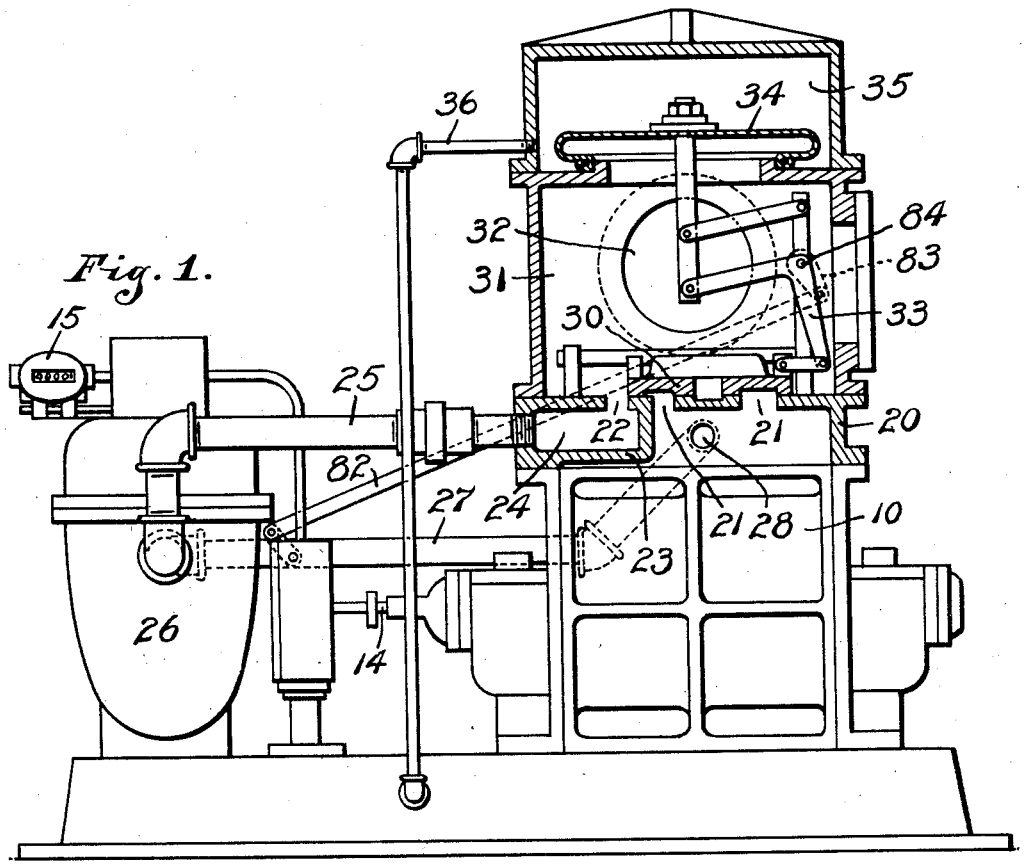
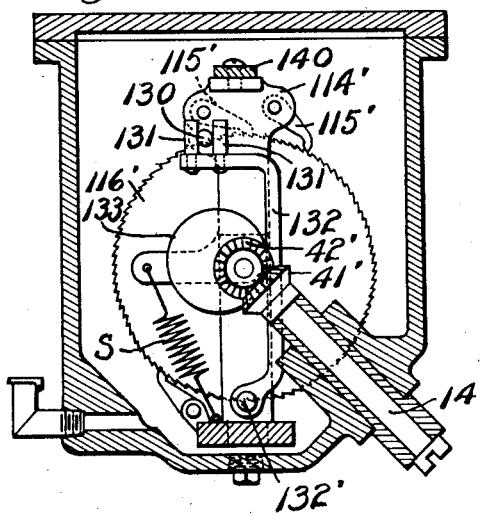
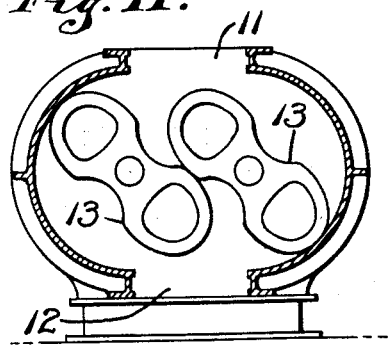
Inventor
Carl R. Houghton,
By Hood + Hahn.
Attorneys Feb. 7, 1933. C. R. HOUGHTON 1,896,527
TANDEM METER
Filed March 12, 1928 5 Sheets-Sheet 2
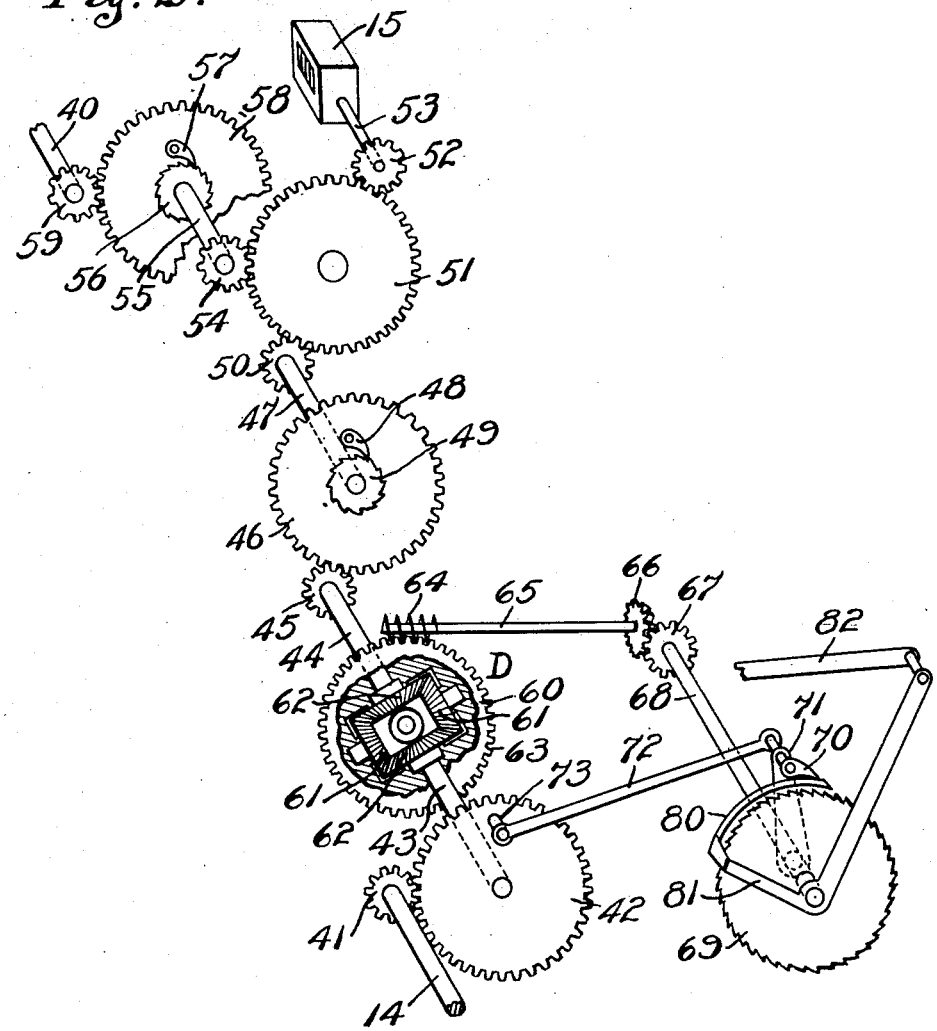
Inventor
Carl R. Houghton,
By Hood + Hahn.
Attorneys

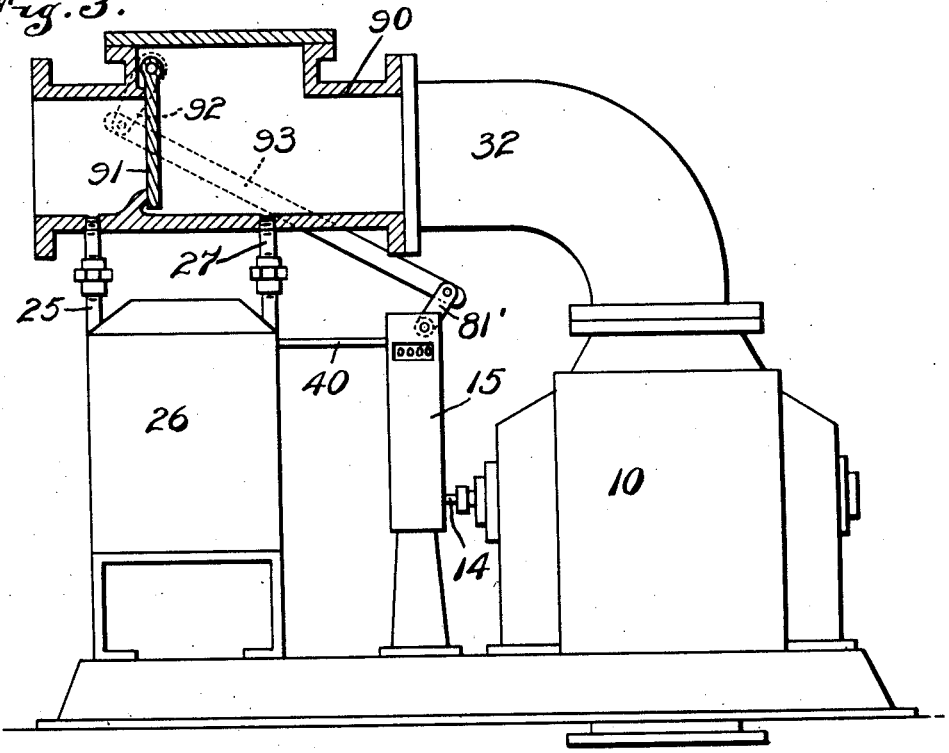
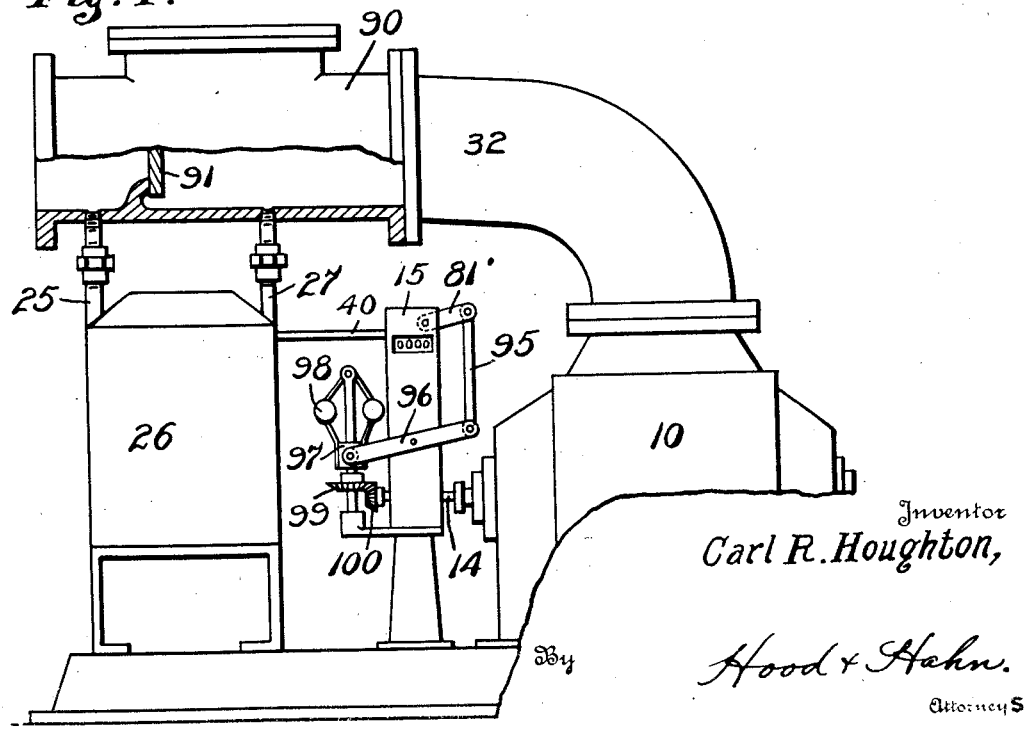

Inventor
Carl R. Houghton,
By Hood + Hahn.
Attorneys

Feb. 7, 1933.  C. R. HOUGHTON  1,896,527
TANDEM METER
Filed March 12, 1928  5 Sheets-Sheet 5
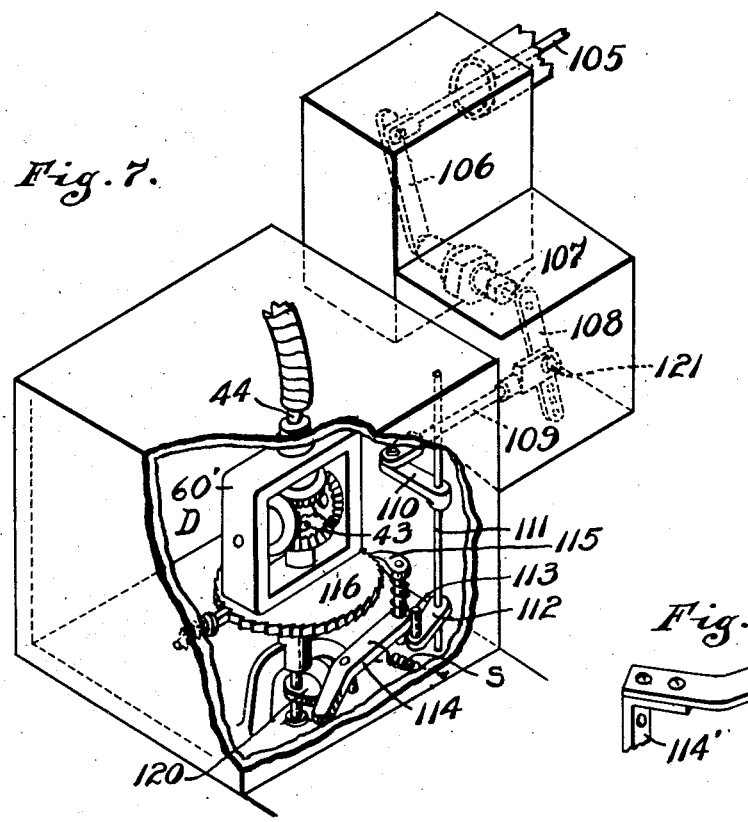
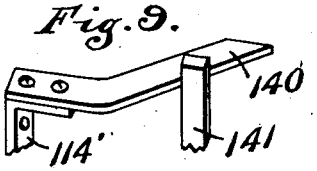
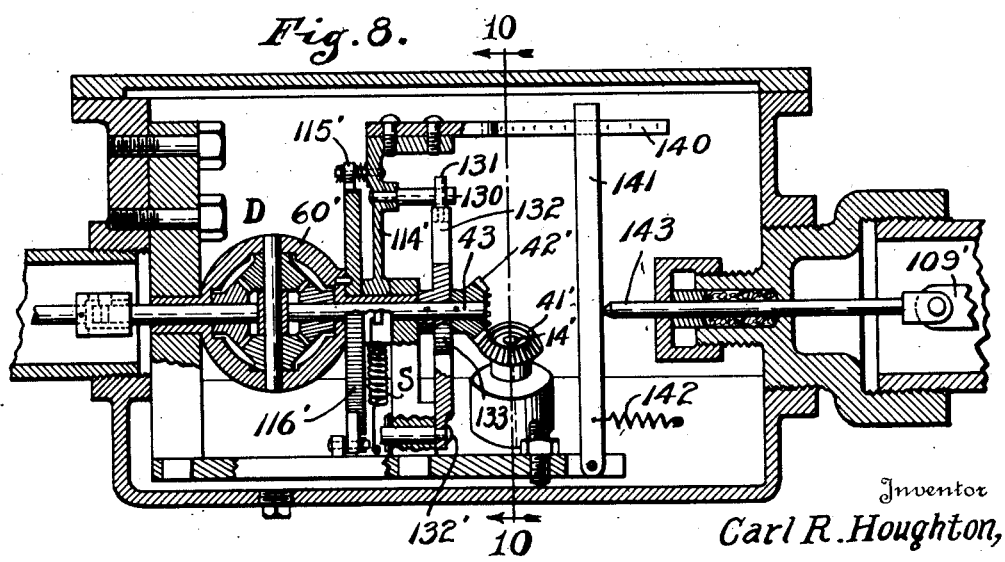
Inventor
Carl R. Houghton,
By
Hood & Hahn.
Attorneys Patented Feb. 7, 1933

1,896,527

UNITED STATES PATENT OFFICE

CARL R. HOUGHTON, OF CONNERSVILLE, INDIANA, ASSIGNOR TO THE CONNERSVILLE BLOWER COMPANY, INC., OF CONNERSVILLE, INDIANA, A CORPORATION OF INDIANA

TANDEM METER

Application filed March 12, 1928. Serial No. 260,912.

A gas meter which has come into use within the past few years and has come to be known as a positive displacement gas meter comprises a main casing in which are rotatably mounted two inter-related lobed elements which are geared together and so formed that, during rotation, certain definite volumes of gas are entrapped between the lobes of the rotary elements and the casing and thus advanced through the meter, the volume passing through the meter being thus measured and a record thereof produced by a suitable register driven by one of the rotary elements.

In such a construction the lobed elements do not actually touch each other or the casing, a certain small amount of clearance being provided in order that the rotary elements may rotate freely under a very small differential of pressure between the inlet and outlet sides of the meter. As an unavoidable consequence of this construction there is a leakage of gas through the clearance spaces of the meter and this leakage is commonly known as slippage. The amount of slippage of any given gas depends not only upon the areas of the clearance spaces but also upon the differential pressure and the speed of rotation of the rotary elements, the leakage thus being a variable at different demand volumes. At low demands, the slippage may be sufficient to supply the demand and there will be no operation of the rotary elements and consequently no registry of the delivery.

In order to compensate, to some extent, for the slippage through the positive displacement meter it has been customary to so connect the register with the positive displacement meter as to automatically register an extra amount of gas per revolution of the rotary elements equal to the amount of slippage which will occur during the average demands. Such an arrangement produces a record or registry which is accurate when the meter is operating at one particular speed under the assumed or predetermined differential but registration is too low at lower speeds (lower than average demand) and too high at higher speeds (higher than average demands) and therefore, if accuracy is desired the user must mathematically compute the error, from a properly prepared diagram, and make the necessary mathematical correction. In practice it has been found that the rate of slippage volume as compared with the rate of movement of the positive displacement elements of the large demand meter varies inversely with the rate of movement of the displacement elements. That is to say: When the displacement elements are at rest or are moving slowly the volume of gas which will slip through the clearance spaces in a unit of time is greater than the volume of gas which will slip through the clearance spaces during the same unit of time when the displacement elements are moving more rapidly.

The object of my present invention is to produce a device which will automatically vary the connection between the positive displacement meter and the register in such manner as to accurately (or closely approximately) vary the movement of the register in accordance with the rate of flow of gas through the positive displacement meter to automatically record the volume of slippage at all rates of movement of the positive displacement meter.

In order to adapt volume meters of this type for use where there are intermittent periods of small demand, a small volume meter is so associated with the positive displacement large volume meter and the register as to record the volumes of gas delivered through the meter structure during such low demand periods as will not efficiently actuate the large demand positive displacement meter.

This smaller meter is, generally, a meter of the diaphragm type where demands may drop close to zero, although in cases where the small demand, if it exists at all, is for a fair volume, a properly designed small positive displacement meter may be used.

The accompanying drawings illustrate my invention.

Fig. 1 is an elevation, in partial vertical section, of a gas metering unit embodying my invention.

Fig. 2 is a gearing diagram of the gear trains and compensating mechanism between the large demand and small demand meters and the register.

Fig. 3 is an elevation, in partial vertical section, of another arrangement of the two meters and means for determining the flow therethrough.

Fig. 4 is a view similar to Fig. 3 except that the compensating mechanism is actuated by a centrifugal governor driven by the positive displacement meter.

Fig. 7 is a perspective fragmentary detail of a modified form of compensating gear forming part of the structure shown in Fig. 5.

Fig. 8 is a section of a modified form of compensating gear.

Fig. 9 is a fragmentary perspective of a portion of the parts shown in Fig. 8.

Fig. 10 is a section on line 10, 10 of Fig. 8 and

Fig. 11 is a diagrammatic cross section, on a smaller scale, of a positive displacement gas meter of the type used in my apparatus.

Figure 6:
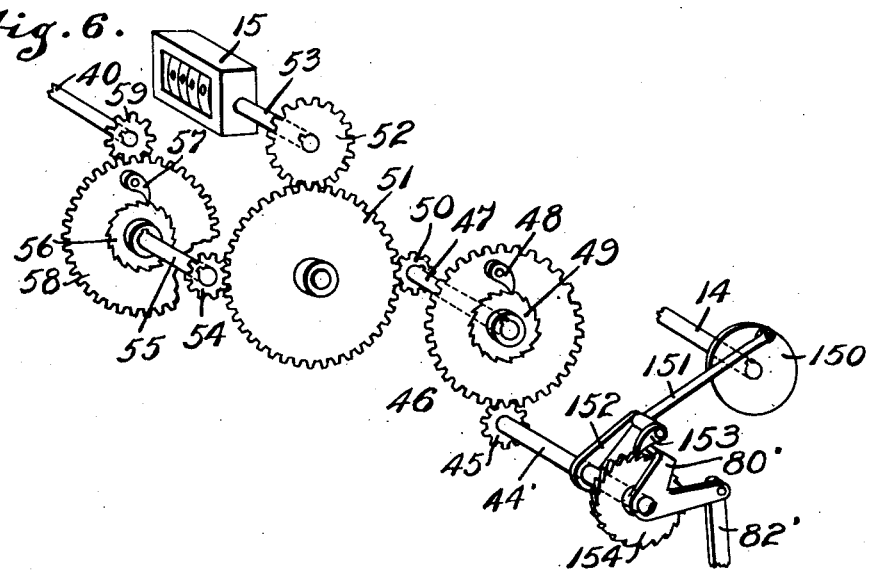
Fig. 6 is a diagram of a modified compensating gear train.

In the drawings 10 indicates the positive displacement meter comprising an external casing having an inlet 11 and outlet 12 and within which are rotatably mounted the lobed rotary elements 13 which are so mounted within the casing as to offer a minimum resistance to rotation and their shaft ends enclosed to prevent external leakage, the two impeller elements being geared together by gears, not shown, in the usual well known manner, and one of the rotary elements having connected thereto a small shaft 14 which is projected outside of the casing and to which the register or recording mechanism 15 is geared.

In the drawings the element 15 is illustrated as an ordinary counter mechanism which is calibrated to give volume readings but it will be readily understood that this is diagrammatic and the register may be either of the type shown or any one of a number of types which will produce a record or registry from which delivered volumes may be determined.

Referring now to Figs. 1 and 2. On the inlet side of the large demand meter 10 is a valve box 20 having ports 21, 21 and 22 on the upper face thereof, ports 21, 21 leading to the inlet side of the large demand meter 10 and port 22 being segregated from direct connection with the large demand meter by partition 23, said partition forming a chamber 24 to which is connected the inlet pipe 25 of the small demand (diaphragm) meter 26, the delivery pipe 27 thereof connecting with the inlet side of the large demand meter 10, at 28, beyond ports 21. Slidably mounted in conjunction with ports 21, 21 and 22 is a valve plate 30 so arranged as to close ports 21 when port 22 is open, and vice versa.

Valve 30 is mounted within an inlet chamber 31 into which the main supply pipe 32 leads and is actuated by a linkage 33 mounted within chamber 31 and connected to a diaphragm 34 subject, on its under side, to the pressures within chamber 31. Diaphragm 34 is enclosed within a chamber 35 which is connected by pipe 36 with the delivery side of the large volume meter 10 so that the upper surface of diaphragm 34 will be subject to the pressures on the delivery side of the meter unit, the arrangement being such that the position of the diaphragm 34, and consequently the position of valve 30, will be dependent upon the differential pressure across the meter unit determined by the demand for gas, and such that at low demand, valve 30 will be in position to close ports 21, 21 and open port 22.

The moving element of the small demand meter 26 (not shown) is connected to a shaft 40 and this shaft and shaft 14 of the large demand meter are both connected by a suitable train of gears to the register 15.

In the arrangement shown in Fig. 1 all gas passing through the small demand meter 26 also passes through the large demand meter 10 and consequently the gearing between the two meters and the register is such that a flow of gas through the small demand meter will only be impressed upon the register when said small demand meter is operating at a volume rate of delivery below a predetermined volume rate and consequently determined speed of movement of the large demand meter.

The gearing for this purpose may take any one of a considerable number of forms and one of such forms is shown diagrammatically in Fig. 2. Secured to the outer end of shaft 14 is a pinion 41 meshing with a gear 42 fixedly carried by a shaft 43 which is in alignment with a shaft 44 provided with a pinion 45 secured to said shaft and meshing with a gear 46 journaled on shaft 47 and provided with a pawl 48 engaging a ratchet 49 secured to shaft 47. Shaft 47 is provided with a pinion 50 secured thereto and meshing with a gear 51 meshing with a gear 52 fixed on the shaft 53 of register 15. Also meshing with gear 51 is a pinion 54 fixedly carried by a shaft 55 having secured thereto a ratchet 56 engaged by a pawl 57 carried by a gear 58 journaled on said shaft 55 and meshing with a pinion 59 fixed on shaft 40, the arrangement being such that register 15 will be driven by whichever of shafts 47 or 55 is moving the faster. It will, of course, be understood that the two ratchet trains described above are merely reducing gear trains interposed between the movable elements of the two meters and the register, that the precise numbers and proportions of the gears will depend upon the relations between the two meters and the register, and that no effort is made in Fig. 2 to indicate with any degree of accuracy the precise proportions which may be readily determined by any one ordinarily skilled in the art.

For the purpose of providing the automatic slippage compensation the two shafts 43 and 44 form the central shafts of a differential gearing D which comprises a central body 60 journaled on the two shafts 43 and 44 and carrying idler pinions 61, 61 which connect gears 62, 62 secured to the inner ends of shafts 43, 44 in a well-known manner.

The main body 60 of the differential gear is provided with worm teeth 63 engaged by worm 64 fixedly carried by a shaft 65 provided with a gear 66 secured thereon and meshing with a gear 67 fixed on a shaft 68. Shaft 68 has secured thereto a ratchet 69 adapted to be actuated by a pawl 70 carried by an arm 71 connected by a pitman 72 with a crank pin 73 on gear 42, the arrangement being such that rotation of gear 42, produced by movement of the rotary elements of the large demand meter, will cause a concurrent and proportionate advancement of the body 60 of the differential gear, thus causing a proportioned and concurrent advancement of shaft 44, in addition to the advancement produced by shaft 43. It will be readily understood that the precise character of the connection between the rotating element of the large demand meter and the body 60 of the differential gear may be any one of a large number of acceptable forms of driving connections, either of the ratchet type or a variable continuously rotary type.

In order to automatically compensate differences in rate of slippage due to variations in rate of movement of the rotary elements of the large demand positive displacement meter, resulting from variations in demand and consequent variations in differential pressure, I arrange, between pawl 70 and ratchet wheel 69, an interceptor 80 conveniently carried by a bell crank 81 journaled on shaft 68 and connected by a link 82 to an arm 83 secured to a shaft 84 connected to one of the levers of the linkage 33 whereby the interceptor 80 will be shifted by the movement of valve 30, the parts being so proportioned that the advancement of element 60 of the differential gear D, and the consequent advancement of shaft 44 additional to the advancement of that shaft due to movement of shaft 43, will be so proportioned to the slippage flow as to cause a properly coordinated advancement of the registering elements of the register 15.

This proper proportioning will, of course, be merely a matter of mathematical calculation, dependent upon the slippage characteristics of the large demand meter 10, and the gearing lying between element 60 and the register, the arrangement being such that, as the rate of flow of gas through the metering unit increases the rate of compensating advancement of the register by the compensating mechanism will decrease.

The mechanism to obtain the desired result indicated in the preceding description may, of course, take many different forms of which I have shown only a few as illustrative. For instance, in Fig. 3 the main inlet pipe 32 has interposed in it a valve casing 90 to which the inlet pipe 25 and the discharge pipe 27 of the small demand meter are connected. Interposed between these two pipes within casing 90 is a flap valve 91 which normally seats so as to force the gas to pass through the small demand meter. As the demand for gas increases valve 91 will be displaced by the flow of gas and, through the medium of arm 92 and link 93, will actuate lever 81', which corresponds to lever 81 of Fig. 2, to actuate an interceptor like interceptor 80 in conjunction with a compensating gear train of the character shown in Fig. 2 and mounted within the casing of register 15.

In Fig. 4 the small demand meter is connected to valve structure 90, as shown in Fig 3 but lever 81', instead of being positioned by the movement of valve 91 is positioned by means of a link 95 and a lever 96, which lever is connected to the axially movable element 97 of a centrifugal governor 98 connected by gears 99 and 100 with the register-actuating shaft of meter 10.

Figure 5:
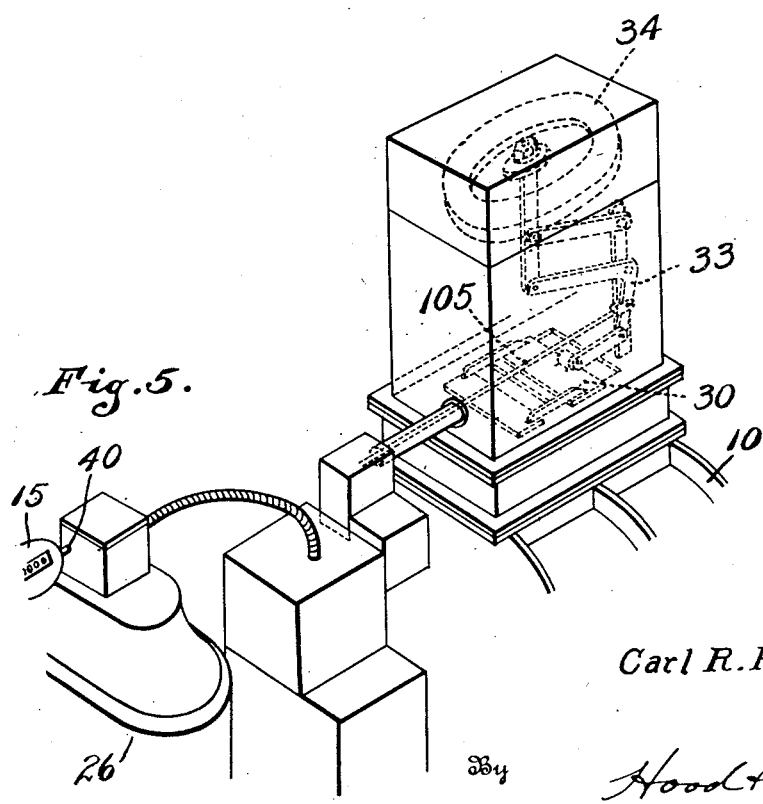
Fig. 5 is a fragmentary diagram of a portion of mechanism similar to that shown in Fig. 1.

The construction shown in Figs. 5 and 7 is somewhat similar to that shown in Fig. 1 except that the compensating mechanism is different.

In this form a link 105 (dotted lines Fig. 5) is connected by arm 106, shaft 107, arm 108, link 109, arm 110 and shaft 111 with a swinging arm 112 provided with a stop finger 113 arranged in the path of movement of a pawl arm 114 carrying a pawl 115 engaging the ratchet wheel 116 journaled upon shaft 43 (which is the shaft 43 of the gear train shown in Fig. 2) and attached to the main body 60' of the differential gear D. A spring S biases arm 114 in the return direction. Shaft 43, as in Fig. 2, is driven by the large demand meter and carries a cam 120 secured thereto and arranged to act on pawl arm 114 to swing the pawl end of said arm away from stop 113, the arrangement being such that movement of stop finger 113 in one direction or the other will increase or diminish the possible movement of arm 114. Link 109 may be connected to arm 108 by an adjustable connection 121 so that the movement of stop finger 113 produced by a movement of the linkage 33, may be properly adjusted.

In Figs. 8, 9 and 10 the ratchet 116' attached to the main body 60' of the differential gear is advanced by pawls 115' carried by an arm 114' journaled on shaft 43 and biased in its return movement by spring S. Arm 114' carries a pin 130 which is projected between two pins 131, 131 carried by an arm 132 pivoted at 132' and engaged by a cam 133 secured to shaft 43. The shaft 43, as in the other forms, is driven by gears 42' and 41' actuated by a shaft 14' connected to the large demand meter. Arm 114' carries an inclined finger 140 arranged to engage a stop finger 141 biased in one direction by a spring 142 and moved in the other direction by a rod 143 connected to a link 109' corresponding to arm 109 of Fig. 7.

In the construction shown in Fig. 6, instead of utilizing the differential gear, the shaft 44' corresponds to shaft 44 of the gear train shown in Fig. 2, the gearing from that point on being the same as the gearing shown in Fig. 2 and all of the movement of the large demand meter is transmitted from its shaft 14 to shaft 44' through the medium of a crank disc 150, attached to shaft 14, a link 151, a pawl arm 152 journaled on shaft 44', a pawl 153 carried by the pawl arm, and a ratchet 154 secured to shaft 44'. Compensation for slippage is accomplished by means of an interceptor 80' arranged to vary the effect of pawl 153 on ratchet 154 and positioned by a link 82' in a manner previously described.

In all of the constructions except that shown in Fig. 4, variation in demand will vary the position of the valve (valve 30 in Figs. 1 and 5; and valve 91 in Figs. 3 and 4) which will be positioned in accordance with the rate of flow of gas through the large demand meter and this movement will in turn determine the amount of advancement of the register over and above the amount of advancement of that register due to rotation of the rotary elements of the meter 10, and thereby recording in the register the total volume of gas which flows through the unit including that which has passed through the clearance spaces of the large demand positive displacement meter.

In Fig. 4 this compensation is obtained by the action of the speed-affected governor actuated by the rotary elements of the large demand positive displacement meter.

In all of the forms shown, the slippage is a function of the rate of flow through the large demand meter and is, therefore, a function of the clearances (leakage spaces) through this meter and also a function of the rate of movement of the lobed elements of this meter.

While my invention has been primarily designed as a gas metering unit it will, of course, be understood that it is applicable also to the metering of liquids.

It will also be understood that the compensating elements of my invention may be used in conjunction with a meter through which slippage may occur, without the concurrent use of a non-slippage type of meter to care for the small demand, if the demand is of such character as to be, during all demand periods, sufficient to properly actuate the positive displacement meter.

In the claims I use the term "positive displacement meter" to indicate a meter through which material slippage will occur; the term "small demand meter" to indicate a meter of the type through which there is either no slippage or through which the slippage is of no material moment; and the term "register" to indicate either a registering mechanism or a recording mechanism.

The rate of movement of the lobed elements of the large demand meter is, of course, a function of the differential pressure existing at any time because of the demand for gas from the outlet piping.

I claim as my invention:

A meter unit comprising a positive displacement meter having a movable element the rate of movement of which varies with variations in differential pressure across the meter unit, a register, a driving train between the element and register, and means varying with variations in the rate of movement of said moving meter element for varying the effect of the driving train on the register inversely with the rate of movement of said moving meter element, said means including a movable element shiftable by variations in differential pressure across said meter.

In witness whereof, I have hereunto set my hand at Connersville, Indiana, this 8th day of March, A. D. one thousand nine hundred and twenty-eight.

CARL R. HOUGHTON.